(12) United States Patent
Hartmann et al.

(10) Patent No.: US 10,856,606 B2
(45) Date of Patent: Dec. 8, 2020

(54) METHOD FOR PRODUCING A SHOE SOLE

(71) Applicant: PUMA SE, Herzogenaurach (DE)

(72) Inventors: Matthias Hartmann, Forchheim (DE); Romain Girard, Lauf an der Pegnitz (DE)

(73) Assignee: PUMA SE, Herzogenaurach (DE)

( * ) Notice: Subject to any disclaimer, the term of this patent is extended or adjusted under 35 U.S.C. 154(b) by 120 days.

(21) Appl. No.: 16/095,239

(22) PCT Filed: Dec. 8, 2016

(86) PCT No.: PCT/EP2016/002066
§ 371 (c)(1),
(2) Date: Oct. 19, 2018

(87) PCT Pub. No.: WO2018/103811
PCT Pub. Date: Jun. 14, 2018

(65) Prior Publication Data
US 2019/0133251 A1    May 9, 2019

(51) Int. Cl.
*B29C 49/48*    (2006.01)
*A43B 13/04*    (2006.01)
(Continued)

(52) U.S. Cl.
CPC .............. *A43B 13/04* (2013.01); *A43B 13/14* (2013.01); *B29C 49/04* (2013.01); *B29C 49/06* (2013.01); *B29C 49/48* (2013.01); *B29C 49/4802* (2013.01); *B29C 49/4817* (2013.01); *B29C 2049/4807* (2013.01); *B29K 2023/06* (2013.01); *B29K 2023/12* (2013.01);
(Continued)

(58) Field of Classification Search
None
See application file for complete search history.

(56) References Cited

U.S. PATENT DOCUMENTS

| | | | |
|---|---|---|---|
| 3,608,215 | A | 9/1971 | Fukuoka |
| 7,401,420 | B2 | 7/2008 | Dojan |
| 9,125,454 | B2 | 9/2015 | De Roode |
| 9,884,947 | B2 | 2/2018 | Prissok |

(Continued)

FOREIGN PATENT DOCUMENTS

| | | |
|---|---|---|
| CN | 1450920 A | 10/2003 |
| CN | 1802408 A | 7/2006 |

(Continued)

OTHER PUBLICATIONS

First Office Action issued in corresponding Chinese Application No. 201680084903.X, dated Feb. 28, 2020, 16 pages.

*Primary Examiner* — Monica A Huson
(74) *Attorney, Agent, or Firm* — Quarles & Brady LLP

(57) ABSTRACT

A method for producing a shoe sole. To be able to produce the shoe sole in an economical fashion and with easily selectable spring and damping characteristics, the invention has the following steps: a) extruding a plastic hose and feeding the plastic hose into a blow mold; b) blow molding the plastic hose into a sole hollow body, wherein recesses are introduced on mutually opposing walls of the sole hollow body during the blow molding process, such that parts of the walls are brought into contact with one another and form a supporting structure between the mutually opposing walls; c) removing the blow-molded sole hollow body from the blow mold; d) at least partially filling the blow-molded sole hollow body with plastic bodies, wherein the plastic bodies are added through a first opening in the sole hollow body.

15 Claims, 4 Drawing Sheets

(51) Int. Cl.
   *B29C 49/04* (2006.01)
   *B29C 49/06* (2006.01)
   *A43B 13/14* (2006.01)
   *B29L 31/50* (2006.01)
   *B29K 69/00* (2006.01)
   *B29K 75/00* (2006.01)
   *B29K 27/06* (2006.01)
   *B29K 23/00* (2006.01)
   *B29K 59/00* (2006.01)
   *B29K 77/00* (2006.01)
   *B29K 33/00* (2006.01)

(52) U.S. Cl.
   CPC ...... *B29K 2027/06* (2013.01); *B29K 2033/12* (2013.01); *B29K 2059/00* (2013.01); *B29K 2069/00* (2013.01); *B29K 2075/00* (2013.01); *B29K 2077/00* (2013.01); *B29K 2995/0091* (2013.01); *B29L 2031/504* (2013.01)

(56) References Cited

U.S. PATENT DOCUMENTS

| | | |
|---|---|---|
| 2002/0113342 A1 | 8/2002 | Tsai |
| 2009/0013558 A1 | 1/2009 | Hazenberg |
| 2014/0151918 A1 | 6/2014 | Hartmann |
| 2016/0278481 A1 | 9/2016 | Le |

FOREIGN PATENT DOCUMENTS

| | | |
|---|---|---|
| CN | 101610692 A | 12/2009 |
| CN | 103717658 A | 4/2014 |
| CN | 106998843 A | 8/2017 |
| DE | 102011108744 B4 | 3/2014 |
| EP | 0215974 A1 | 4/1987 |
| JP | S63079705 U | 5/1988 |
| JP | 2002306280 A | 10/2002 |
| JP | 2013502304 A | 1/2013 |
| JP | 2016182332 A | 10/2016 |
| WO | 2005066250 A1 | 7/2005 |
| WO | 2007082838 A1 | 7/2007 |
| WO | 2010010010 A1 | 1/2010 |

METHOD FOR PRODUCING A SHOE SOLE

CROSS-REFERENCE TO RELATED APPLICATION

The present application is a 371 of International application PCT/EP2016/002066, filed Dec. 8, 2016, the priority of this application is hereby claimed and this application is incorporated herein by reference.

BACKGROUND OF THE INVENTION

The invention relates to a method for producing a shoe sole, especially of such for a sports shoe.

The production of shoe soles especially for sports shoes is a sufficiently known technology. Thereby not only an economical process for the production is aimed for but also to have the possibility to have a possibly good influence onto the spring and damping behavior of the shoe sole and thus of the shoe. Here, also the used material has a significant influence.

In US 2009/0013558 A1 a shoe is described at which the shoe sole consists of different plastic materials which are connected with another, wherein different polymer materials are used. In WO 2007/082838 A1 is described that also expanded thermoplastic polyurethane (E-TPU) can be used beneficially for a shoe sole. In this documents also detailed information is contained for this plastic material; insofar explicitly reference is made to this document.

Also in DE 10 2011 108 744 B4 a shoe is described at which E-TPU is used as material for the sole. Here, it is furthermore described that single foamed plastic spheres, which have mostly a dimension of few millimeters, made of this material are formed to the sole in such a manner that a binder is added into a respective tool according to a possible embodiment so that the plastic spheres are connected with another and form the body of the sole. According to another process water steam under defined pressure is applied to a tool in which the plastic spheres are imported. Thereby, a partial melting of the plastic material occurs so that the plastic spheres are connected with another by positive substance jointing and thus form the body of the sole.

The properties of the shoe which are so obtainable, especially with respect to the spring and damping behavior, are not fully satisfactory in any case. Furthermore, the production process of the mentioned sole is sometimes elaborate and thus costly.

SUMMARY OF THE INVENTION

Thus, it is the object of the invention to provide a method by which a shoe sole can be produced in a cost efficient manner and which spring and damping behavior can be adjusted in a desired manner. Thus, the shoe sole should be producible economically and with easy adjustable spring and damping properties.

The solution of this object by the invention is characterized in that the method comprises the following steps:
  a) Extruding a plastic hose and feeding the plastic hose into a blow mold or injection molding of a plastic blank and feeding the plastic blank into a blow mold;
  b) Blow molding the plastic hose or the plastic blank into a sole hollow body, wherein recesses are introduced on mutually opposing walls of the sole hollow body during the blow molding process, such that parts of the walls are brought into contact with one another and form a supporting structure between the mutually opposing walls;
  c) Removing the blow-molded sole hollow body from the blow mold;
  d) at least partially, preferably completely, filling the blow-molded sole hollow body with plastic bodies, wherein the plastic bodies are added through a first opening in the sole hollow body.

As plastic bodies especially spheres, ellipsoids or cylinders are used. The dimensions of the single plastic bodies in the three special directions are preferably between 1 mm and 13 mm, specifically preferably between 3 mm and 6 mm. The plastic bodies consist thereby especially of foamed plastic material.

As the material for the plastic bodies preferably used is expanded thermoplastic polyurethane (E-TPU), expanded thermoplastic elastomere (E-TPE) (especially expanded thermoplastic elastomere based on olefin (E-TPO)) and/or expanded polypropylene (EPP).

The sole hollow body consists however preferably of thermoplastic polyurethane (TPU), of thermoplastic elastomere (TPE), of polyamide (PA) and/or of rubber material.

A preferred embodiment of the method proposes that after above step d) a sealing, especially a welding, of the first opening occurs.

Furthermore it can be provided that during or after above step d) an evacuation of air from the sole hollow body occurs. This occurs preferably via a second opening which is disposed at a distance from the first opening.

Thereby, the plastic bodies are preferably arranged in the sole hollow body without connection to another. Accordingly, the single spheres or ellipsoids are not connected with another by any measures but are arranged loosely in the sole hollow body.

The plastic bodies are thereby preferably arranged in full package and preferably under pressure in the sole hollow body.

The production of the supporting structure takes place preferably by creating one of the recesses with the closed end region into one of the walls by means of a first deformation tool and by creating the other recess with the open end region into the other wall by means of a second deformation tool, wherein the closed end region of one of the recesses is designed for entry into the open end of the other recess. By doing so very beneficially a spring and damping element respectively in the kind of a piston-cylinder-system is realized. At intended use of the shoe which is equipped with the described shoe sole thus relative movements between the two recesses in vertical direction can occur (when the shoe sole stands on the ground). By the choice of the geometry of the two recesses and especially of the closed end region at the one hand and the opening in the other recess at the other hand the spring rate of the sole in vertical direction as well as its damping behavior can be influenced.

An embodiment of the method provides that prior to closing of the blow mold and carrying out of above step b) an insert is placed into the blow mold so that the insert connects with the sole hollow body during the blow molding process.

The insert can be pre-fabricated by an injection molding process. The insert has according to a preferred embodiment a U-shaped design. This is placed especially as a heel clip in the rear region of the shoe sole. The insert consists thereby preferably of thermoplastic polyurethane (TPU).

It is also possible, however not preferred due to the higher production requirements, that by the blow-molding process several hollows which are separated from another are produced in the inner of the sole hollow body which are then filled with respective plastic bodies. Those can as the case may be then have also different physical properties to influence selectively the spring and damping properties of the shoe sole.

The plastic bodies have preferably a hardness between 75 and 90 Shore A, preferably between 80 and 85 Shore A. They have preferably a bulk density between 100 and 300 $kg/m^3$.

It should be mentioned the following with respect to the expanded thermoplastic polyurethane (E-TPU) for the plastic bodies which are imported into the blow-molded sole hollow body which are preferably used: This material is known as such and is used in shoes. It is for example available under the name "PearlFoam" from Huntsman International LLC or under the name "Infinergy" from BASF SE. Concerning this material explicitly reference is made to WO 2005/066250 A1 where details of this material, thus of expanded thermoplastic polyurethane and its production, can be found.

Furthermore, explicitly reference is made to WO 2010/010010 A1 with respect to the pre-known thermoplastic elastomer based on urethane in which an expanded thermoplastic polymer blend containing a blowing agent is disclosed which contains thermoplastic polyurethane and styrene polymer. The polymer blend can thereby contain at least one further thermoplastic polymer. As further thermoplastic polymer especially polyamide (PA), polymethyl methacrylate (PMMA), polycarbonate (PC), polyethylene (PE), polypropylene (PP), polyvinylchloride (PVC), cellulose and polyoxymethylene (POM) respectively can be used.

Thus, according to the invention in a blow-molded sole hollow body especially expanded plastic foam spheres or ellipsoids (eventually also cylindrically shaped bodies) are used by use of especially E-TPU, E-TPE or EPP (to produce for example very light soles) which are filled into the created hollow in the sole hollow body (said sole hollow body can also be denoted as pre-fabricated "cage" for the spheres and ellipsoids respectively).

The mentioned supporting structure allows that the sole supports the foot in an optimal manner under load at intended use. This is essential under the aspect that otherwise the plastic bodies which are arranged in the inner of the sole hollow provide possibly an insufficient support function for the foot due to the fact that the plastic bodies are not connected with another but are arranged loosely.

The spheres, ellipsoids respectively cylinders, preferably made of E-TPU, influence significantly the damping of the shoe so that the sole part with the filled hollow is preferably used as midsole.

The sole can be connected with the shoe upper (bootleg) by means of sewing or gluing which is known as such.

Above, the production of the sole as a complete form part is described. Of course, the invention can also be employed if only a part of the sole is produced as described and is as the case may be connected with another sole part.

Although the extrusion of a plastic hose and its immediate supply into the blow mold in the warm state is preferred, alternatively—as mentioned above—the injection molding of a plastic blank can be provided which is then supplied to the blow mold. In this case typically at first the injection molding process for the plastic blank is carried out; when the plastic blank is transferred to the blow molding machine and has to be blow-molded in the same it is again heated up before so that it can be deformed to the sole hollow body.

In the drawing an embodiment of the invention is shown.

DETAILED DESCRIPTION OF THE INVENTION

Figure 1:
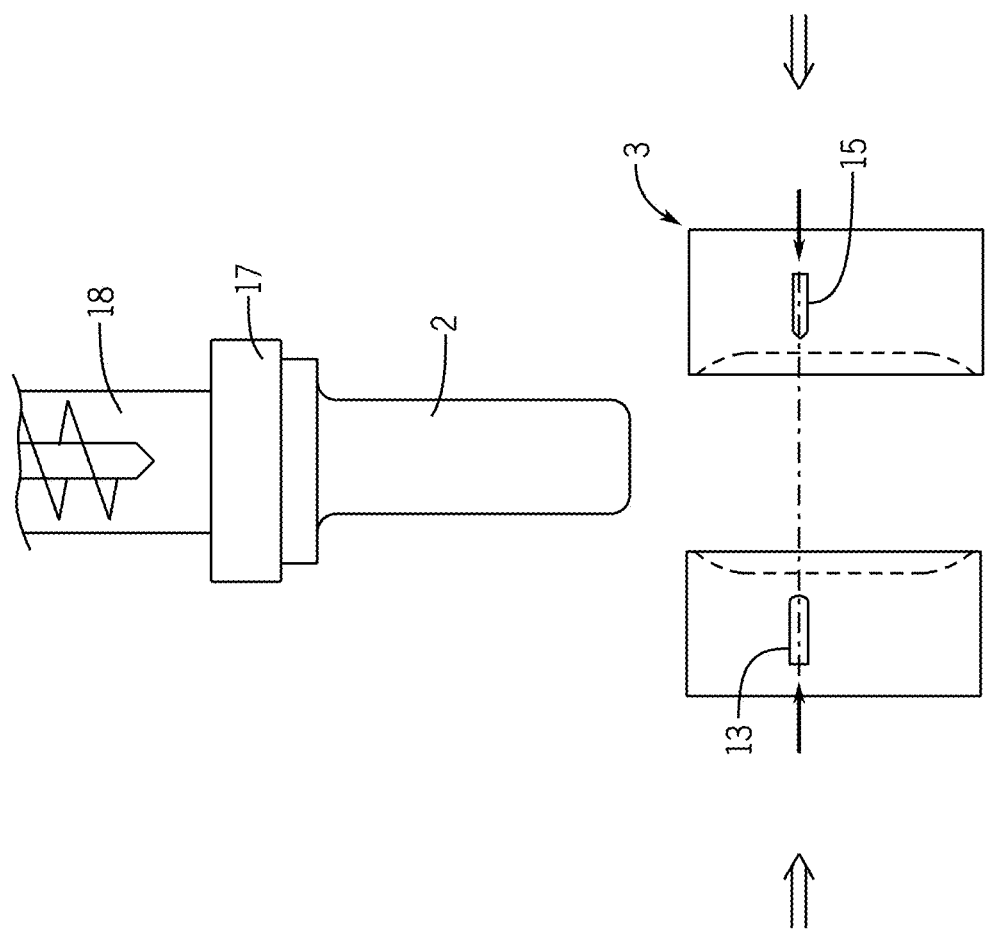
FIG. 1 shows schematically a first process step of the production of a shoe sole according to the invention.

In FIG. 1 the start of the production process of a shoe sole is shown schematically. An extruder 18 plasticizes plastic material and outputs the same via an extrusion head 17 so that a plastic hose 2 is produced which is closed around the whole circumference. When the same is long enough it is placed into a blow mold 3 which consists of two mold halves which are moved against another into the direction of the double arrow and then enclose the plastic hose 2 for blow molding in known manner.

As already mentioned alternatively an injection molding of a plastic blank can be taken in consideration which is then deformed in the blow mold 3.

By the blow molding process a sole hollow body 4 (see FIGS. 2 and 3) is produced which provides a reception space in its inner.

A first deformation tool 13 and a second deformation tool 15 are schematically indicated. Those tools 13, 15 are moved against another in the direction of the arrow when the mold halves of the blow mold 3 are closed. By the tools 13, 15 supporting structures 9 (see FIGS. 2 to 4) are formed into the sole hollow body 4.

A plurality of tools 13, 15 are provided although in FIG. 1 is shown only one single pair of tools 13, 15.

As can be seen from FIG. 2 a number of the mentioned supporting structures 9 have been produced presently which are described in detail below. They have the purpose to provide a supporting function at desired locations via the contact area of the foot on the surface of the shoe sole 1 so that at the application of the body weight of the wearer of the shoe the shoe sole 1 does not yield to the side in an uncontrolled manner.

Figure 4:
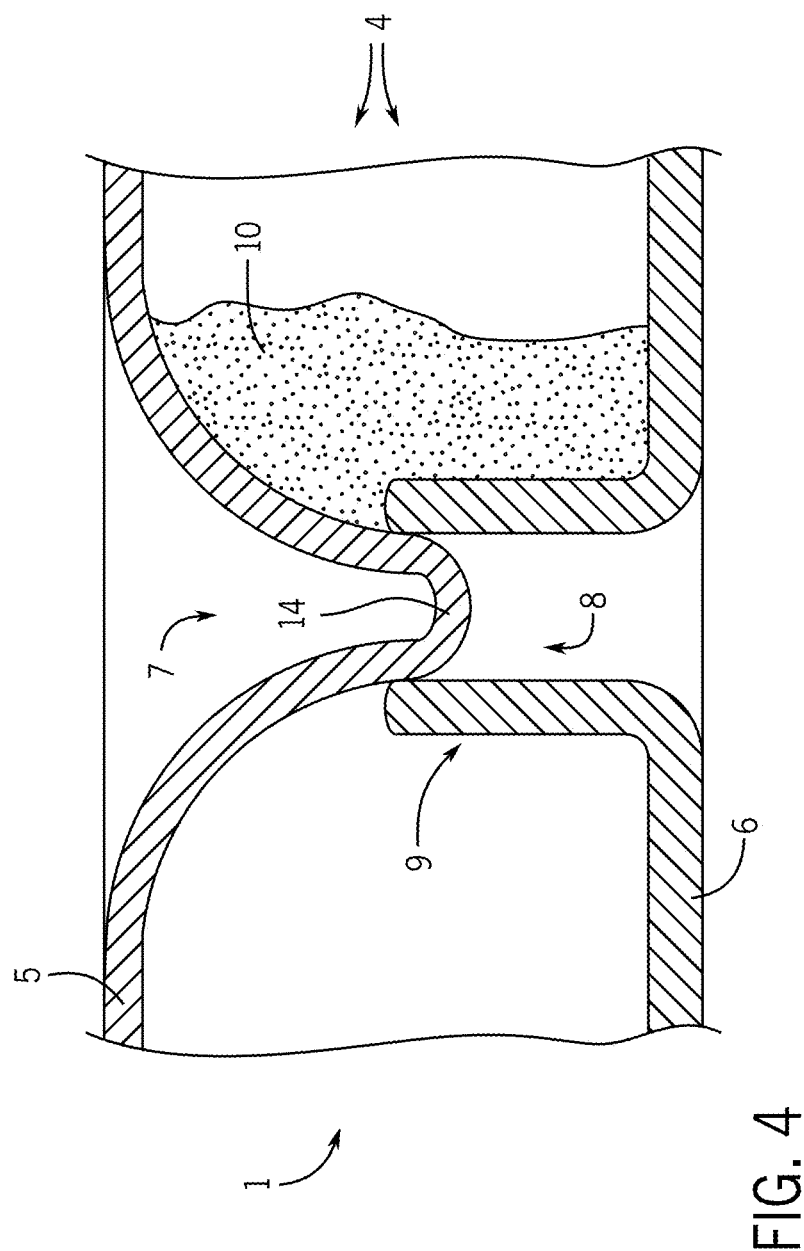

Details of the supporting structure are apparent from FIG. 4. Here it can be seen that the sole hollow body 4 comprises an upper wall 5 and a bottom wall 6 which are arranged facing another with a distance after carrying out the blow molding process and enclose the mentioned hollow between another. By the deformation tools 13 and 15 recesses 7 and 8 are formed at those locations which are apparent from FIG. 2, namely by the first deformation tool 13 the recess 7 and by the second deformation tool 15 the recess 8.

As can be seen the recess 7 has a closed end region 14 while the recess 8 has an opening by the second deformation tool 15 which is designed needle-shaped at its axial end. This opening is dimensioned in such a manner that the recess 7 with its closed end region 14 can at least partially enter into the same.

The supporting structure 9 which is produced in such a manner prevents respectively impedes a relative movement between the upper wall 5 and the bottom wall 6 in horizontal direction (at intended use of the shoe which has the mentioned shoe sole 1).

Figure 3:
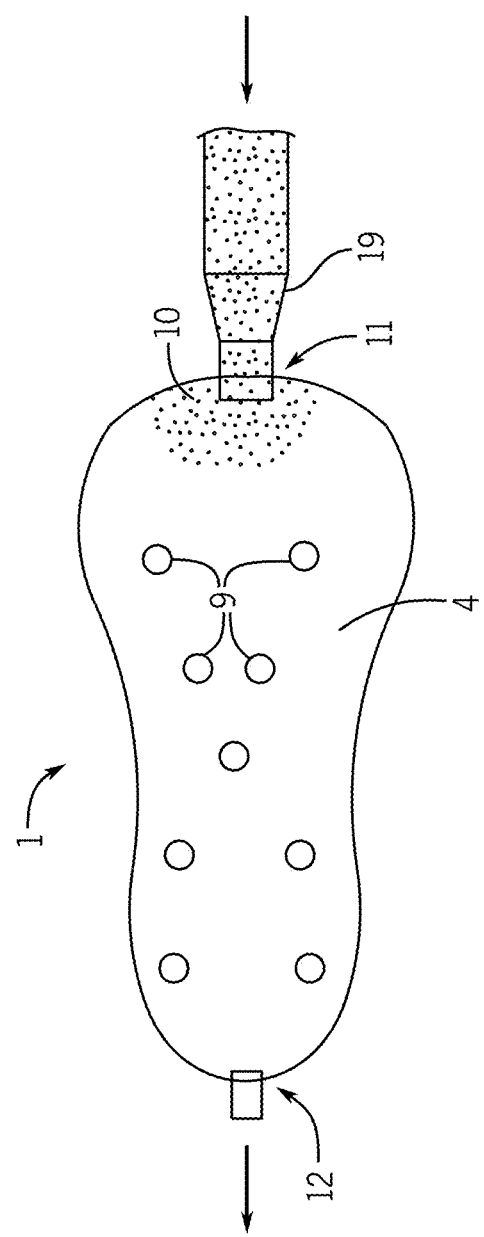
FIG. 3 shows schematically the subsequent process step at which the sole hollow body of the shoe sole is filled with plastic bodies and FIG. 4 shows the section A-B according to FIG. 2.

When the described sole hollow body 4 is completed insofar the hollow, which is contained in the same, is filled with plastic bodies 10. This is illustrated in FIG. 3. For this a filling nozzle 19 is inserted into an opening 11 in the sole hollow body 4. Then, via the filling nozzle 19 sphere-shaped or ellipsoid plastic bodies 10 made of expanded thermoplastic polyurethane (E-TPU) are filled, as the case may be supported by pressurized air, into the sole hollow body 4 until the same is completely filled with plastic bodies 10. With respect to the material of the plastic bodies 10 hints to respective publications are already given above.

It is essential that the plastic bodies 10 are filled into the hollow of the sole hollow body 4 quasi as loose material and are placed in the hollow unconnected with another. Accordingly the plastic bodies 10 are free from any connection with another. The plastic bodies 10 indeed stabilize mutually after filling of the sole hollow body 4, but are arranged loosely to another.

Hereby not only the damping behavior of the sole and thus of the shoe can be influenced very beneficially; also the production process is easy and can be carried out cost-efficiently.

By the evacuation of air, i.e. by the application of a vacuum at a second opening 12 of the sole hollow body, the filling process can be supported and as the case may be after completion of the same air can be evacuated from the inner of the sole hollow body 4 (see arrow at the opening 12).

The openings 11 respectively 12 can be closed after completion of the filling process with plastic bodies 10. Here, especially a welding of the openings is taken in consideration. So, a hermetically closed hollow is created in the shoe sole 1 which is filled with the loosely arranged plastic bodies 10.

In cooperation with the supporting structure 9 the possibility is given to influence the spring and damping behaviors of the shoe sole in a certain range arbitrarily but to take care nevertheless that a good hold for the foot at good stability of the sole is given at the intended use of the shoe which is provided with the shoe sole.

Figure 2:
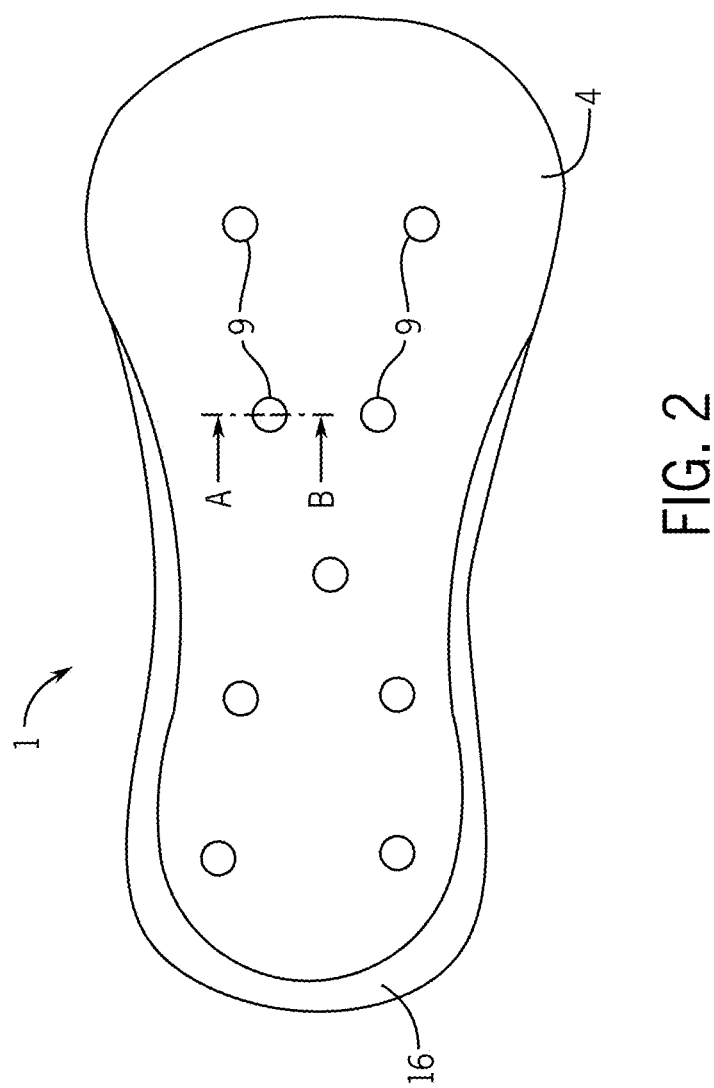
FIG. 2 shows the top plan view onto the shoe sole after carrying out the process step according to FIG. 1, wherein the sole hollow body of the shoe sole is not yet filled.

In FIG. 2 also a preferred embodiment of the described process is illustrated: Here, a U-shaped insert 16 can be seen which is inserted prior to the closing of the blow mold 3 into the cavity of the same. By the blow molding process the insert 16 is firmly connected (welded) with the plastic hose 2 respectively the sole hollow body 4.

The insert 16 can be used to influence selectively the supporting function of the shoe sole 1. Preferably, the insert 16 is used as heel shell which supports the foot of the user of the shoe which is equipped with the shoe sole in the rear region and namely in the region of the heel.

LIST OF REFERENCES

1 Shoe sole
2 Plastic hose
3 Blow mold
4 Sole hollow body
5 Wall
6 Wall
7 Recess
8 Recess
9 Supporting structure
10 Plastic body
11 First opening
12 Second opening
13 First deformation tool
14 Closed end region
15 Second deformation tool
16 Insert
17 Extrusion head
18 Extruder
19 Filling nozzle

The invention claimed is:

1. A method for producing a shoe sole, comprising the steps:
   a) extruding a plastic hose and feeding the plastic hose into a blow mold or injection molding of a plastic blank and feeding the plastic blank into a blow mold;
   b) blow molding the plastic hose or the plastic blank into a sole hollow body, wherein recesses are introduced on mutually opposing walls of the sole hollow body during the blow molding process, such that parts of the walls are brought into contact with one another and form a supporting structure between the mutually opposing walls;
   c) removing the blow-molded sole hollow body from the blow mold;
   d) at least partially filling the blow-molded sole hollow body with plastic bodies, wherein the plastic bodies are added through a first opening in the sole hollow body.

2. The method according to claim 1, wherein as plastic bodies spheres, ellipsoids, or cylinders are used.

3. The method according to claim 2, wherein the dimensions of the single plastic bodies in the three special directions are between 1 mm and 13 mm.

4. The method according to claim 1, wherein the plastic bodies consist of foamed plastic material.

5. The method according to claim 1, wherein the plastic bodies are selected from the group consisting of expanded thermoplastic polyurethane, expanded thermoplastic elastomer, and expanded polypropylene.

6. The method according to claim 1, wherein the sole hollow body is selected from the group consisting of thermoplastic polyurethane, thermoplastic elastomer, polyamide, and rubber material.

7. The method according to claim 1, wherein after step d) a sealing, especially a welding, of the first opening occurs.

8. The method according to claim 1, wherein during or after step d) an evacuation of air from the sole hollow body occurs, especially via a second opening which is disposed at a distance from the first opening.

9. The method according to claim 1, wherein the plastic bodies are arranged in the sole hollow body without connection to another.

10. The method according to claim 1, wherein the plastic bodies are arranged in full package and preferably under pressure in the sole hollow body.

11. The method according to claim 1, wherein the production of the supporting structure takes place by creating one of the recesses with the closed end region into one of the walls by means of a first deformation tool and by creating the other recess with the open end region into the other wall by means of a second deformation tool, wherein the closed end region of one of the recesses is designed for entry into the open end of the other recess.

12. The method according to claim 1, wherein prior to closing of the blow mold and carrying out of step b), an insert is placed into the blow mold so that the insert connects with the sole hollow body during the blow molding process.

13. The method according to claim 12, wherein the insert is pre-fabricated by an injection molding process.

14. The method according to claim 12, wherein the insert has a U-shaped design.

15. The method according to claim 12, wherein the insert consists of thermoplastic polyurethane.

* * * * *